Nov. 5, 1963   T. H. PAPWORTH   3,109,307
GRAIN PROBE WITH RATCHET HANDLE
Filed May 8, 1961
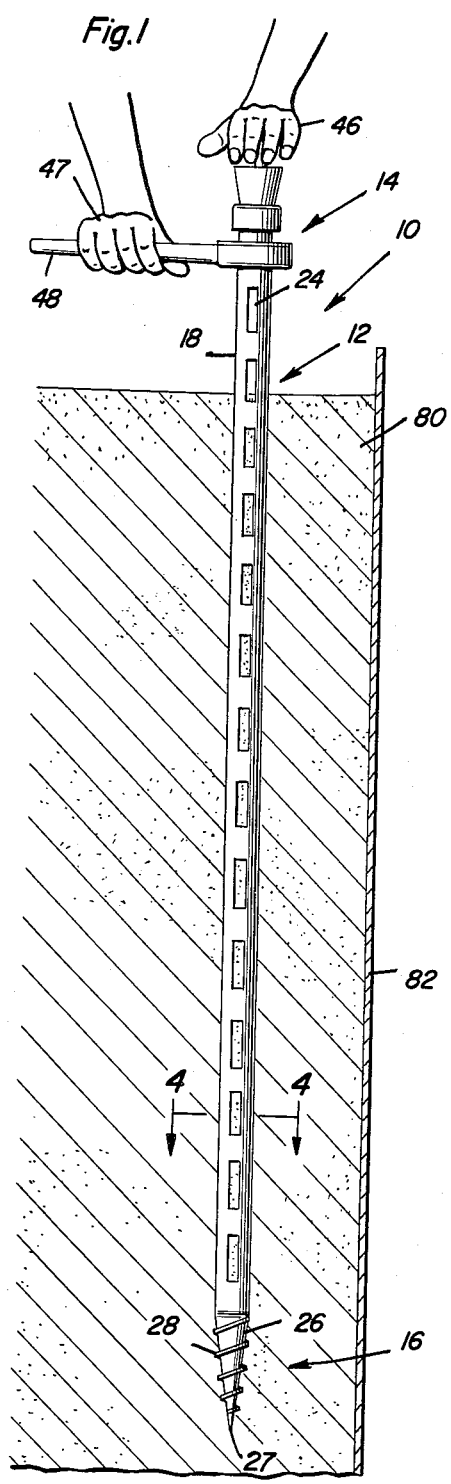
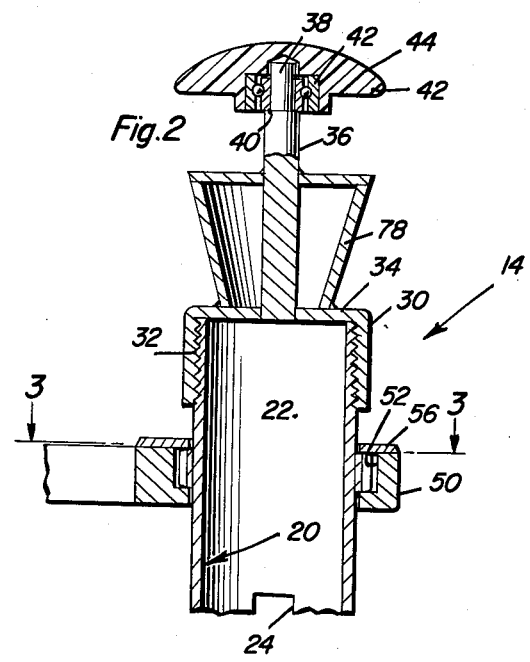
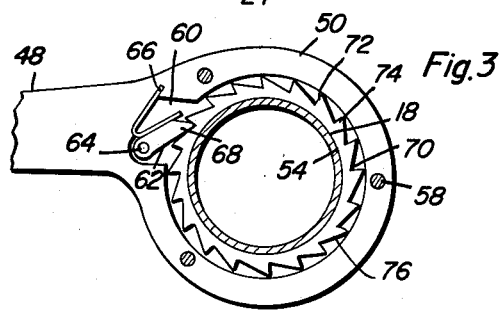
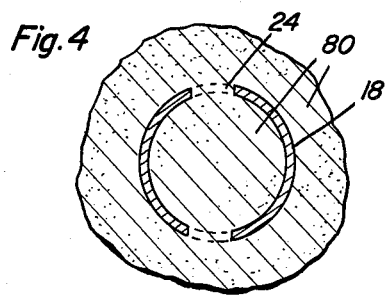
Thomas H. Papworth
INVENTOR.
BY *Clarence A. O'Brien*
*and Harvey B. Jacobson*
Attorneys

United States Patent Office 3,109,307
Patented Nov. 5, 1963

3,109,307
GRAIN PROBE WITH RATCHET HANDLE
Thomas H. Papworth, 552 Honore Drive,
New Orleans, La.
Filed May 8, 1961, Ser. No. 108,616
3 Claims. (Cl. 73—425.2)

This invention relates to probing devices, and more particularly to an auger-type probe adapted to be inserted into solid material, viscous liquid, and particularly granular material for taking samples thereof.

It is a primary object of this invention to provide an auger-type probing device especially designed for sampling grain with a lever connected to the probe by means of a one-way clutch or ratchet mechanism whereby the operator may rotate the probe in one direction by merely oscillating the lever back and forth.

It is another object of the invention to provide an auger-type grain probe which has a freely rotatable cap on its upper end whereby the operator may continuously press down on the cap with one hand for pushing the probe into the grain, and a ratchet lever is provided on the probe whereby the operator may rotate the probe with his other hand, it not being necessary for him to remove either hand during the operation of the probe.

It is still another object of the invention to provide a probing auger with a new and improved type of screw point.

It is still another object of the invention to provide an auger which may be operated more easily and many times faster than conventional augers, and is therefore much more efficient.

It is still another object of the invention to provide a grain sampling auger which is simple in design, economical to manufacture, requires a minimum of maintenance and upkeep, and is long lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical view illustrating my improved auger in use;

FIGURE 2 is a vertical cross sectional view taken through the upper portion of FIGURE 1 on an enlarged scale;

FIGURE 3 is a horizontal cross sectional view taken substantially on the plane of line 3—3 in FIGURE 2; and FIGURE 4 is a cross sectional view on an enlarged scale taken substantially on the plane of line 4—4 of FIGURE 1.

Referring to the drawings, it can be seen that my grain probe 10 comprises a body 12, an operating assembly 14, and an auger device 16.

The body 12 comprises an elongated tube 18 having a cylindrical bore 20 extending longitudinally therethrough so as to form a cylindrical chamber 22. A plurality of apertures 24 are provided in the walls of the tube 18, and are arranged in rows parallel to the axis of the tube 18. The apertures 24 are generally equally spaced longitudinally from one another and are shown as being rectangular in shape although the exact shape thereof may vary. The exact shape and size of the apertures are determined by the use to which the probe is to be put.

The probe is primarily designed to be used for sampling grain such as wheat, barley, oats, corn, etc. The apertures 24 are of such a size and spacing that the chamber 22 will become substantially filled when the probe is inserted into grain as illustrated in FIGURE 1. It is apparent that in large grain such as corn for example, that is to be sampled, that the apertures 24 must be larger than the smaller grain such as if wheat is to be sampled.

The lower end of the tube 18 is closed by a conical member 26 which has a spiral thread 28 formed thereon. The conical member 26 and spiral thread 28 comprise the auger device 16. The operating assembly 14 includes a cap 30 having internal threads which receive the threads 32 formed on the upper end of a tube 18. The end wall 34 of the cap seals the upper end of the tube 18 and has fixed to its center a post 36 which is coaxial with the longitudinal axis of the tube 18. The upper end of the post 36 has a reduced portion 38 which terminates at an annular shoulder 40. A ball bearing 42 has its inner race tightly fitted onto the reduced portion 38 and rotatably journals a push button 42 in a conventional manner. The push button 42 has an upper smooth and part spherical surface 44 adapted to contact the palm of the operator's hand as shown at 46.

The operating assembly further includes an operating lever 48 having an annular collar 50 formed on one of its ends. The collar 50 has an annular recess 52 formed within its inner surface, and this recess rotatably receives a ratchet ring 54 which is fixed to the outer periphery of the upper end of the tube 18. A bearing plate 56 is fixed to the upper surface of the collar 50 by means of rivets 58. As shown in FIGURE 2, the bearing plate 56 is rotatably supported on the upper surface of the ratchet ring 54 and thereby rotatably maintains the lever 48 in a fixed vertical position with respect to the tube 18.

A generally rectangular chamber 60 is formed at one end of the lever 48 adjacent to and extending into the annular recess 52. A ratchet cog 62 is secured in the chamber 80 by means of a pin 64 extending through an aperture or bore in the end of the cog 62 and fixed to the lever 48. The cog 62 may oscillate on the pin 64, and is urged outwardly of the recess 60 by means of a generally V-shaped leaf spring 66. The spring 66 urges the apex or point 68 of the cog 52 into the recesses 70 formed between the teeth 74 of the ratchet ring 54. Each tooth 74 has a generally radially extending abutment face 72 engageable with the point 68 to prevent clockwise rotation of the lever 48 as viewed in FIGURE 3. However, each of the teeth 74 have sloping cam surfaces 76 which cam the point 68 outwardly and permit the lever 48 to rotate in a counterclockwise direction as viewed in FIGURE 3.

As shown in FIGURES 1 and 2, the lower portion of the post 36 is enclosed by a conical member 78 which reinforces the post and also serves as a handle member for carrying or supporting the tube 18.

If it is desired to sample the grain 80 in the bin 82, the operator holds the push button 42 in one hand, preferably the left hand as shown at 46, and grasps the handle 48 with his right hand 47. He then pushes with his left hand 46 so as to force the point 27 of the auger device 16 vertically downwardly into the grain 80. When the resistance of the grain prevents further penetration of the auger device 16, the operator merely oscillates the handle 48 back and forth about the axis of the tube 18. As shown in FIGURE 3, when the handle 48 and cog 62 are rotated in a counterclockwise direction, the cog merely rides over the cam surfaces 76. However, when the lever 48 is oscillated in a clockwise direction, the point 68 of the cog 62 abuts against the abutment surface 72 and forces the tube 18 and auger assembly 18 to rotate in a clockwise direction. The clockwise rotation of the auger 16 causes it to screw downwardly into the grain 80 until the tube 18 is substantially completely covered by the grain. As the tube 18 moves downwardly in the grain 80, the grain passes through the apertures 24 so as to fill the cylindrical chamber 22. Once the auger or grain probe 10 has been forced into the grain, it is relatively easy to withdraw it. This is done by grabbing the handle 48 with one hand and tube 18 with the other and pulling up and down on the device to remove it from the bin 82 and grain 80. However, to facilitate removal of the grain probe 10, the ratchet device may be made reversible whereby oscillation of the handle 48 will cause downward movement of the tube 18 during one setting of the ratchet device, and during the other setting of the ratchet device, operation of the handle 48 will cause upward movement of the probe.

After the tube 18 has become filled, and is withdrawn from the grain, the grain in the tube may be emptied by holding the tube 18 in an inclined position and tapping it lightly with an instrument. Alternatively, the cap 30 may be removed, and the chamber 22 may be emptied by turning the tube 18 upside-down.

From the above description, it can be seen that the probe may be inserted deeply into granular material for taking samples thereof with a minimum of effort. This is very highly desirable when taking samples of grain, since it is very important to determine the moisture content of the grain at various points in the bin before it is stored. Also, when the grain is sold, it is often necessary to not only determine the moisture content of the grain but also the quality and the amount of impurities therein.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A grain sampling probe comprising an elongated tube having a leading end provided with a penetrating point and an auger cooperable with and constituting a part of said penetrating point, said tube being open at its upper end and provided along its body portion with a plurality of holes permitting grain to pass therethrough into the inner hollow chamber portion of said tube, a rigid cap removably mounted on and closing said upper end, said cap being provided with a fixed upstanding axially disposed post, a thrust pressure button axially aligned with and swivelly mounted on the upper end of said post, and a reinforcing member encompassing the major portion of said post and having an upper end fixedly joined to a median portion of said post below said pressure exerting button and having a lower end portion fixedly joined to the top side of said cap, pawl and ratchet means mounted on and encircling an upper portion of said tube adjacent to but spaced slightly below said cap, and a tube turning handle at right angles to said tube and cooperatively connected with said pawl and ratchet means.

2. A grain probe comprising an elongated rigid tube having aperture means embodying a multiplicity of holes, said holes being of a size proportional to the nature of the grain which is to be passed therethrough, and said holes affording communication with the hollow chamber portion of the tube, having a leading conical end providing a penetrating point and provided on its exterior with threads defining an auger, the upper end of said tube being screw-threaded, a screw cap removably screwed thereon, said cap being provided centrally with an upstanding part, the upper end of said post being shouldered and provided with a swivelly mounted end thrust pressure exerting button, pawl and ratchet means embracing the upper end of said tube, and a handle at right angles to said tube and having a portion embracing and cooperating with the pawl and ratchet means.

3. A probe of the class described comprising an elongated tube having an auger at its leading end, provided along its body portion with a multiplicity of holes permitting grain to pass therethrough into the inner hollow chamber portion of the tube, the upper end of said tube being screw-threaded, a screw cap screwed atop said member by way of said screw-threads, said cap having an upstanding axially disposed post, said post being provided on its upper end with a swivelly mounted end thrust pushbutton, a portion of said post being surrounded by a conical member which serves to reinforce the post and which provides an auxiliary handle to facilitate carrying and handling the tube, pawl and ratchet means mounted on the upper portion of said tube, and a handle at right angles to the tube operatively connectible with the pawl and ratchet means.

References Cited in the file of this patent

UNITED STATES PATENTS

| | | |
|---|---|---|
| 323,057 | Meylor | July 28, 1885 |
| 399,687 | Morningstar | Mar. 19, 1889 |
| 446,075 | Myers | Feb. 10, 1891 |
| 460,666 | Stacy | Oct. 6, 1891 |
| 613,759 | Cooper | Nov. 8, 1898 |
| 1,994,884 | Chew | Mar. 19, 1935 |
| 2,821,086 | Baker et al. | Jan. 28, 1958 |
| 3,065,637 | Landes | Nov. 27, 1962 |